United States Patent
Gundlach

(10) Patent No.: US 7,097,030 B2
(45) Date of Patent: Aug. 29, 2006

(54) LONG, FLEXIBLE CONVEYOR BELT MODULES IN MODULAR PLASTIC CONVEYOR BELTS

(75) Inventor: James O. Gundlach, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/904,003

(22) Filed: Oct. 19, 2004

(65) Prior Publication Data

US 2006/0081449 A1 Apr. 20, 2006

(51) Int. Cl.
*B65G 23/06* (2006.01)
*B65G 17/06* (2006.01)
*B65G 15/32* (2006.01)

(52) U.S. Cl. .................. 198/834; 198/853
(58) Field of Classification Search .............. 198/834, 198/853
See application file for complete search history.

(56) References Cited

U.S. PATENT DOCUMENTS

| | | | | |
|---|---|---|---|---|
| 1,075,548 A * | 10/1913 | Cilley | ............... | 198/834 |
| 2,000,499 A * | 5/1935 | Roland | ............... | 198/834 |
| 3,602,364 A * | 8/1971 | Maglio et al. | ............... | 198/689.1 |
| 4,069,911 A | 1/1978 | Ray | ............... | 198/853 |
| 4,138,011 A * | 2/1979 | Lapeyre | ............... | 198/844.2 |
| 4,170,281 A | 10/1979 | Lapeyre | ............... | 198/844 |
| 4,238,184 A * | 12/1980 | Schilling | ............... | 431/59 |
| 4,925,016 A | 5/1990 | Lapeyre | ............... | 198/834 |
| 5,083,659 A * | 1/1992 | Bode et al. | ............... | 198/853 |
| 5,105,937 A * | 4/1992 | Gundlach | ............... | 198/853 |
| 5,470,293 A * | 11/1995 | Schonenberger | ............... | 482/54 |
| 6,695,134 B1* | 2/2004 | Rubino et al. | ............... | 198/851 |
| 6,695,135 B1* | 2/2004 | Lapeyre | ............... | 198/853 |
| RE38,607 E * | 10/2004 | Guldenfels et al. | ............... | 198/834 |
| 6,811,023 B1* | 11/2004 | Christiana et al. | ............... | 198/822 |
| 6,896,125 B1 | 5/2005 | Webster et al. | ............... | 198/844.2 |
| 2002/0148708 A1* | 10/2002 | Bonnet | ............... | 198/850 |

FOREIGN PATENT DOCUMENTS

EP 484883 A1 * 5/1992
WO WO 03/076311 A1 9/2003

OTHER PUBLICATIONS

Intralox Engineering Manual 2000, copyright 1999, cover and pp. 2-79 and 2-80, Intralox, Inc., Harahan, Louisiana, USA.

* cited by examiner

*Primary Examiner*—Gene O. Crawford
*Assistant Examiner*—Mark A. Deuble
(74) *Attorney, Agent, or Firm*—James T. Cronvich

(57) ABSTRACT

A modular plastic conveyor belt constructed of flexible belt modules molded out of a material such as a flexible elastomeric compound that enables the belt to wrap closely around drive sprockets. Drive elements in the bottom of the belt are uniformly spaced in the direction of belt travel. The distance between consecutive drive elements is the drive pitch, which is less than the pitch, roughly the length, of each module. A belt constructed of these modules has fewer joints between modules than a typical modular conveyor belt of the same length.

8 Claims, 2 Drawing Sheets

LONG, FLEXIBLE CONVEYOR BELT MODULES IN MODULAR PLASTIC CONVEYOR BELTS

BACKGROUND

The invention is related generally to power-driven conveyors and, more particularly, to modular plastic conveyor belts constructed of a series of rows of long, flexible modules connected together by hinge rods.

Modular plastic conveyor belts are widely used to convey raw meat and poultry in processing plants. These belts are typically constructed of many stiff plastic belt modules arranged in a bricklay pattern. Each row of modules has leading and trailing hinge eyes that interleave with the hinge eyes of leading and trailing rows. The rows are connected serially together into an endless belt by hinge rods received in passageways formed through the aligned interleaved hinge eyes. The belt can articulate at hinge joints so formed between rows. These belts are looped between drive and idler sprockets or drums, which have driving structure, such as drive teeth, that engages drive members at drive locations spaced apart along the length of the belt. The spacing between consecutive drive locations in the direction of belt travel along the length of the belt defines the drive pitch of the belt. Typically, the drive pitch of a modular belt equals the length of each row to allow the modular belt made of stiff modules to wrap closely around the sprocket with good sprocket-belt engagement.

Belt sanitation is an important consideration in meat and poultry applications. Blood, fat, and other contaminants can hide in nooks and crannies in the structure of the belt. The hinged joints between belt rows and the seams between side-by-side modules in each row are two areas of a belt that can harbor these contaminants. Frequent washing by cleansers and water directed into these areas is necessary to attain the required degree of cleanliness that is so important in these food applications. But frequent washing is messy, time-consuming, and expensive. That's why there is an ongoing need for conveyor belts that are easier to clean.

SUMMARY

The need for an easier-to-clean belt and other needs are satisfied by a modular plastic conveyor belt embodying features of the invention. In one aspect, a belt comprises a series of flexible modules that are connected end to end at joints into an endless belt having an outer surface and an inner surface. The distance between consecutive joints defines a module pitch. Drive elements are arranged along the inner surface of the belt at drive locations, which are uniformly spaced in a direction of belt travel. The distance between consecutive drive locations in the direction of belt travel defines a drive pitch for the belt. The drive pitch is less than the module pitch. For example, the module pitch may be an integral multiple of the drive pitch.

In another aspect of the invention, a conveyor belt module comprises a module body that extends longitudinally from a first end to a second end, laterally from a right side to a left side, and in thickness from a top to a bottom. The module body is made of a flexible material that enables the module to flex about a lateral axis. The module body includes a first set of aligned hinge eyes along the first end and a second set along the second end. The distance from the first set of aligned hinge eyes to the second set generally defines the module pitch. Drive elements are uniformly spaced longitudinally at the bottom of the module body. The longitudinal distance between consecutive drive locations defines a drive pitch of the modules, which is less than the module pitch.

In yet another aspect of the invention, a modular plastic conveyor belt comprises a plurality of conveyor belt modules. Each module includes a module body that extends longitudinally from a first end to a second end, laterally from a right side to a left side, and in thickness from a top to a bottom. The module body is made of a flexible material that enables it to flex about a lateral axis. The module body also includes a first plurality of aligned hinge eyes along the first end and a second plurality along the second end. The distance from the first plurality of aligned hinge eyes to the second plurality generally defines a module pitch. Drive elements are uniformly spaced longitudinally at drive locations at the bottom of the module body. The longitudinal distance between consecutive drive locations defines a drive pitch that is less than the module pitch. The belt modules are connected end to end with the first plurality of hinge eyes along the first end of a module interleaved with the second plurality of hinge eyes along the second end of an adjacent module to form lateral passageways through the interleaved hinge eyes. Hinge rods received in the passageways connect adjacent modules together into an endless conveyor belt.

In another aspect of the invention, a conveyor comprises a modular plastic conveyor belt constructed of belt modules and hinge rods. Each belt module includes a flexible module body that extends longitudinally from a first end to a second end and in thickness from a top to a bottom. A first plurality of aligned hinge eyes lies along the first end, and a second plurality lies along the second end. The distance from the first plurality of aligned hinge eyes to the second plurality generally defines a module pitch. Drive elements at the bottom of the module body are uniformly spaced apart longitudinally at drive locations. The longitudinal distance between consecutive drive locations defines a drive pitch that is less than the module pitch. The belt modules are connected end to end. The first plurality of hinge eyes along the first end of a module are interleaved with the second plurality of hinge eyes along the second end of an adjacent module. Passageways are formed through the interleaved hinge eyes. Hinge rods received in the passageways connect adjacent modules together into an endless conveyor belt. A drive wheel, such as a sprocket or drum, has driving surfaces spaced uniformly along the periphery of the wheel at spacings equal to the drive pitch of the belt. The driving surfaces engage the drive elements to drive the belt. The module bodies are flexible enough to wrap around the periphery of the drive wheel.

In still another aspect of the invention, a modular plastic conveyor belt comprises a plurality of flexible belt modules and a plurality of hinge rods. Each belt module extends longitudinally in a direction of belt travel from a first end to a second end, laterally from a right side to a left side, and in thickness from a top to a bottom. Each module also has a generally flat article-conveying surface at the top. A first set of hinge eyes is along the first end of each module, and a second set is along the second end. A set of lateral drive bars is disposed at plural drive bar locations at the bottom of each module. The modules are arranged end to end. The first set of hinge eyes at the first end of a module are interleaved with the second set of hinge eyes of an adjacent module. The interleaved hinge eyes at each end form a lateral passageway through the aligned hinge eyes. The passageway receives a hinge rod to connect adjacent rows together into an endless conveyor belt.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
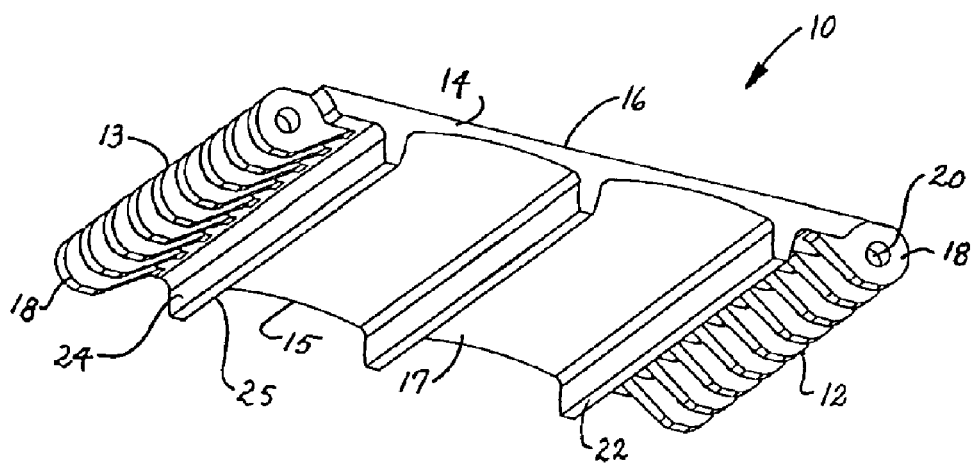
FIG. 1 is a pictorial view of a single module of a modular plastic conveyor belt embodying features of the invention.

A plastic module for a conveyor belt embodying features of the invention is shown in FIG. 1. The module 10 is a plastic module body that extends longitudinally from a first end 12 to a second end 13, laterally from a right side 14 to a left side 15, and in thickness from a top 16 to a bottom 17. Hinge eyes 18 are laterally spaced apart along the first and second ends. Apertures 20 in the hinge eyes are laterally aligned. The top of the module in this example is generally flat to serve as an article-conveying surface for a conveyor belt. Extending from the bottom of the module are lateral bars 22, which may serve as drive elements or provide impact resistance. The bars are positioned at uniformly spaced locations. In this example, each drive bar is generally trapezoidal in cross section. Each slanted face 24, 25 of a bar may be used as a drive surface depending on the direction in which a belt containing the module is driven.

Figure 2:
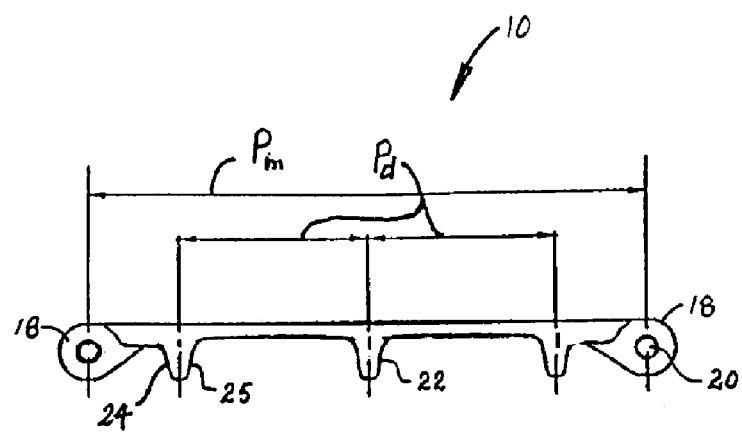
FIG. 2 is a side elevation view of the module of FIG. 1 in an unflexed condition.

As shown in FIG. 2, the module has three drive elements 22 spaced longitudinally by a distance $P_d$ that defines a drive pitch of the module. Many belt modules, such as the one shown in FIG. 2, are designed to be driven bidirectionally. The drive elements of bidirectional belt modules may include two drive surfaces, such as the slanted faces 24, 25 of the drive element 22. One face receives a driving force in one direction of belt travel; the other face receives a driving force in the reverse direction of belt travel. Other bidirectional belt modules may include separate drive elements for forward and reverse travel. Consequently, the drive pitch $P_d$ of a module or a belt is more specifically defined as the longitudinal distance between consecutively driven drive surfaces for a given direction of belt travel. The effective length of the module as it would be when connected into a belt is given by its module pitch $P_m$, which is defined generally as the distance between the centers of the hinge eyes 18 at opposite ends of the module. In this example, the module pitch $P_m$ is three times the drive pitch $P_d$, unlike typical conveyor belt modules, for which $P_m/P_d=1$. Preferably, the module pitch is an integral multiple of the drive pitch. (By integral multiple is meant a multiple of 2 or greater.) Thus, a belt constructed of these modules has fewer hinges that can harbor contaminants than a conventional belt.

Figure 3:
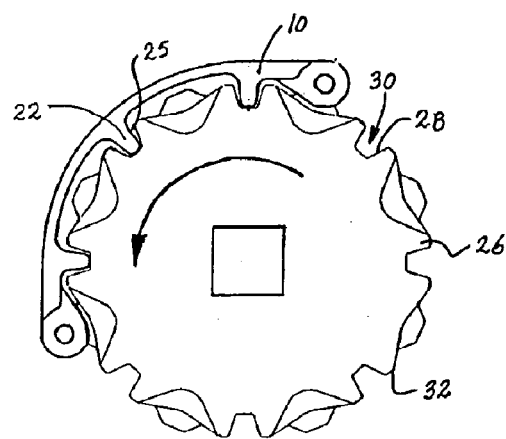
FIG. 3 is a side elevation view of the module of FIG. 1 flexing around a sprocket wheel.

Conventional conveyor belt modules, which are molded out of thermoplastic materials, are stiff and bend only slightly about a lateral axis. The module 10, however, is molded out of a flexible compound, such as polyurethane or a polyether or polyester thermoelastomer, that allows the module to flex about a lateral axis. In this way, the module can wrap around a drive sprocket wheel 26, as shown in FIG. 3. Driving surfaces in the form of trailing walls 28 of notches 30 formed in the periphery 32 of the sprocket engage the trailing faces 25 of the drive elements 22 in the module.

Figure 4:
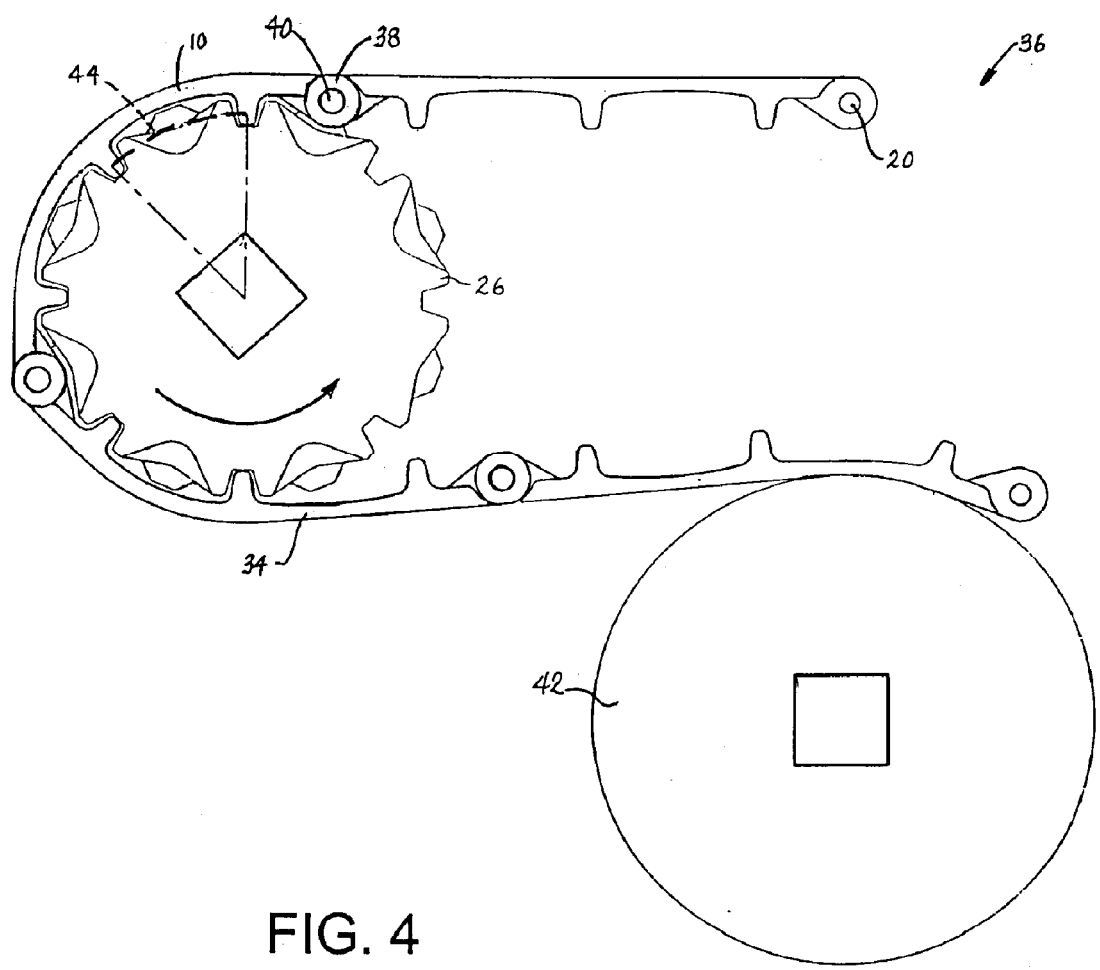
FIG. 4 is a side elevation view of an end portion of a conveyor using a belt constructed of modules as in FIG. 1.

A portion of a modular conveyor belt 34 constructed of the modules of FIGS. 1–3 is shown in the conveyor segment 36 of FIG. 4. The belt is constructed of a series of the belt modules 10. The trailing hinge eyes 18 of a leading module are interleaved with the leading hinge eyes of a trailing module at a hinge joint 38. Hinge rods 40 are installed in the lateral passageways formed by the aligned apertures 20 in the hinge eyes to connect the modules together at the joints. The flexible modules wrap around the sprocket and around a return roller 42, or shoe or drum, in the return path. The pitch of the sprocket is measured along an arc 44 between consecutive driving surfaces. The sprocket pitch matches the drive pitch of the belt and, in this example, drives each module at three locations along the module's length. In this way, sprocket-to-belt engagement is enhanced. Furthermore, the flexibility of the belt allows small-diameter sprockets to be used, which can result in a conveyor having a smaller vertical profile.

Thus, the invention has been described in detail with respect to a preferred version, but other versions are possible. For example, the belt could have drive pockets along the bottom, instead of drive bars, to mate with a sprocket having driving teeth on its periphery. As another example, the belt could be constructed of more than one module per row in a bricklay pattern with seams between side-by-side modules, instead of with a single module per belt row. So, as these few examples suggest, the spirit and scope of the claims are not meant to be limited to the preferred version.

What is claimed is:

1. A modular plastic conveyor belt comprising:
    a series of flexible belt modules connected end to end at joints into an endless belt having an outer surface and an inner surface, wherein the distance between consecutive joints defines a module pitch;
    drive elements on each module arranged along the inner surface of the belt at drive locations spaced apart from the joints and uniformly spaced in a direction of belt travel to define a drive pitch as the distance between consecutive drive locations in the direction of belt travel;
    wherein the drive pitch is less than the module pitch; and
    wherein the module pitch is an integral multiple of the drive pitch.

2. A modular plastic conveyor belt as in claim 1 wherein the belt modules are made of a flexible elastomeric compound.

3. A conveyor belt module comprising:
    a module body extending longitudinally from a first end to a second end, laterally from a right side to a left side, and in thickness from a top to a bottom;
    wherein the module body is made of a flexible material that enables the module to flex about a lateral axis and includes:
        a first plurality of aligned hinge eyes along the first end and a second plurality of aligned hinge eyes along the second end, the distance from the first plurality of aligned hinge eyes to the second plurality defining generally the module pitch;
        drive elements spaced apart from the hinge eyes and uniformly spaced longitudinally at drive locations at the bottom of the module body, the longitudinal distance between consecutive drive locations defining a drive pitch that is less than the module pitch;
    wherein the length of the module is an integral multiple of the drive pitch.

4. A conveyor belt module as in claim 3 wherein the module body is made of a flexible elastomeric compound.

5. A conveyor belt module as in claim 3 wherein the drive elements are trapezoidal bars.

6. A modular plastic conveyor belt comprising:
   a plurality or conveyor belt modules, each module including:
      a module body extending longitudinally from a first end to a second end, laterally from a right side to a left side, and in thickness from a top to a bottom;
      wherein the module body is made of a flexible material enabling the module body to flex about a lateral axis and includes:
         a first plurality of aligned hinge eyes along the first end and a second plurality of aligned hinge eyes along the second end, the distance from the first plurality of aligned hinge eyes to the second plurality defining generally the module pitch;
      drive elements on each module spaced apart from the hinge eyes and uniformly spaced longitudinally at drive locations at the bottom of the module body, the longitudinal distance between consecutive drive locations defining a drive pitch that is less than the module pitch; and
      wherein the module pitch is an integral multiple of the drive pitch;
   a plurality of hinge rods;
   wherein the conveyor belt modules are connected end to end with the first plurality of hinge eyes along the first end of a module interleaved with the second plurality of hinge eyes along the second end of an adjacent module to form lateral passageways through the interleaved hinge eyes to receive hinge rods to connect adjacent modules together into an endless conveyor belt.

7. A conveyor comprising:
   a modular plastic conveyor belt comprising a plurality hinge rods and a plurality of belt modules, each belt module including:
      a flexible module body extending longitudinally from a first end to a second end and in thickness from a top to a bottom and including:
         a first plurality of aligned hinge eyes along the first end and a second plurality of aligned hinge eyes along the second end, the distance from the first plurality of aligned hinge eyes to the second plurality defining generally a module pitch;
      drive elements spaced apart from the hinge eyes and uniformly spaced longitudinally at drive locations at the bottom of the module body, the longitudinal distance between consecutive drive locations defining a drive pitch that is less than the module pitch; and
      wherein the module pitch is an integral multiple of the drive pitch;
   wherein the belt modules are connected end to end with the first plurality of hinge eyes along the first end of a module interleaved with the second plurality of hinge eyes along the second end of an adjacent module to form passageways through the interleaved hinge eyes to receive hinge rods to connect adjacent modules together into an endless conveyor belt;
   a drive wheel having driving surfaces spaced uniformly along the periphery of the wheel at spacings equal to the drive pitch of the belt to drivingly engage the drive elements at the bottom of the belt;
   wherein the module bodies are flexible enough to wrap around the periphery of the drive wheel.

8. A modular plastic conveyor belt comprising:
   a plurality of flexible belt modules, each module extending longitudinally in a direction of belt travel from a first end to a second end, laterally from a right side to a left side, and in thickness from a top to a bottom, each module further having a generally flat article-conveying surface at the top, a first set of hinge eyes along the first end, a second set of hinge eyes along the second end, the longitudinal distance from the first set of hinge eves to the second set defining generally a module pitch, and a set of lateral drive bars disposed at plural drive bar locations spaced apart from the hinge eyes on the bottom of each module, the longitudinal distance between consecutive drive bar locations defining a drive pitch that is less than the module pitch, wherein the module pitch is an integral multiple of the drive pitch;
   a plurality of hinge rods;
   wherein the belt modules are arranged end to end with the first set of hinge eyes at the first end of a module interleaved in alignment with the second set of hinge eyes at the second end of an adjacent module and forming a lateral passageway through the aligned hinge eyes to receive a hinge rod to connect adjacent rows together into an endless conveyor belt.

\* \* \* \* \*